Aug. 3, 1954  R. ADELL  2,685,473

PROTECTIVE TRIM MOLDING FOR VEHICLE DOOR EDGES

Filed Aug. 10, 1953

INVENTOR.
ROBERT ADELL
BY
ATTORNEY.

UNITED STATES PATENT OFFICE 2,685,473

PROTECTIVE TRIM MOLDING FOR VEHICLE DOOR EDGES

Robert Adell, Detroit, Mich.

Application August 10, 1953, Serial No. 373,110

1 Claim. (Cl. 296—44)

This invention relates to motor vehicles and more particularly to improved bodies therefor in which the leading edges of the vehicle swinging closures are provided with ornamental and protective molding.

The present application is a continuation-in-part of my co-pending applications Serial No. 280,297, filed on April 3, 1952 for Trim Molding; and Serial No. 328,065, filed on December 26, 1952 for Automobile Body Construction.

Provision of said swinging closures results in a number of very difficult problems in this particular art, for some of which no adequate solution has yet been found in spite of numerous attempts and a great variety of expedients proposed. One of such problems is confronted in suspending such closures in their respective recesses in a body and fitting it therein in such a manner that in the closed position of the closure there is no gap, or no difference in the width of the gap between the edges of the swinging closures and the adjacent edges of the body.

Another serious problem present in the construction of the swinging closures of automobile bodies is in the susceptibility of the swinging edges of such closures to nicking. This difficulty is particularly serious in the case of doors.

The above explained problem has been solved in its major portion by the provision of the ornamental and protective trim molding disclosed in my said copending applications. However, another serious problem has developed in applying the trim molding to the edges of the closures and particularly to the trailing edge of the doors.

Various means for positively securing the molding to the door edge have been proposed. For instance, it has been attempted to drill holes through the door edge for the passage of connectors such as screws. Although such holes are covered by the molding after the latter is installed, drilling of the edge constitutes an irreparable change in the body clearly apparent from the outside of the body if the molding is removed, and, therefore, objectionable for this reason. In the attempts to connect the molding to the door edge by causing the molding to grip the edge thereof, it was found that unless the gripping action of the molding is rather strong, the molding may slip off in use, due to its working itself off the edge because of the road vibrations and shocks caused by closing the door. On the other hand, making the molding sufficiently rigid to have a stronger gripping action, i. e. to have the lips or legs of the generally U-shape cross section of the molding closed sufficiently to cause substantial opening thereof in application of the molding to the edge, causes scratching and scuffing of the paint and thus damaging the door edge.

In addition, application of such molding to the edge is coupled with considerable difficulties. It has been also found that even with the automobiles of the same make and model, the door edges vary in thickness from automobile to automobile because of manufacturing variations as well as variations in the thickness of the sheet metal stock used. Thus, a molding adapted to grip the edge of one automobile tightly but properly, may be too loose on some automobiles, and so tight on others as to prevent its application to door edges.

It was suggested also that the molding should be made less rigid and more readily distortable with a view that it could be compressed by hand prior to application and thereupon slipped over the door edge. Again it was found that with such a construction collapsing or compressing the molding prior to application would have to be done in a special die or mold to ensure the uniform collapsing of the molding rather than gripping it with fingers in spots that, because of the polished, shiny surface of the molding, would become immediately apparent. Such collapsing of the molding proved to be impractical and difficult to do in the field.

One of the objects of the present invention is to provide an improved molding and means for connecting the same to the door edge, whereby the difficulties and disadvantages explained above are overcome and largely eliminated and whereby a molding is provided which grips the edge of a door tightly irrespective of manufacturing variations in the thickness thereof, and which does not require precollapsing of the molding in the field prior to its application to the door edge.

Another object of the present invention is to provide improved connecting means for connecting ornamental and trim molding to the trailing edge of an automobile door, which means compensate for variation in the thickness of the trailing edge of the door.

A further object of the present invention is to provide ornamental and protective molding for the trailing edge of automobile doors, which molding in spite of being made of relatively thin sheet material is sufficiently rigid to produce strong gripping action, and the edges of which are rounded and do not produce scratching or scuffing of the paint on the door edge to which it is applied.

It is an added object of the present invention to provide an improved ornamental and protective molding of the nature specified above which is simple in construction, dependable in use, is easy to apply and is relatively inexpensive to manufacture.

Further objects and advantages of this inventen will be apparent from the following description and appended claim, reference being had to the accompanying drawings forming a part of this specification wherein like reference characters designate corresponding parts in the several views.

It is to be understood that the invention is not limited in its application to the details of construction and arrangement of parts illustrated in the accompanying drawings, since the invention is capable of other embodiments and of being practiced or carried out in various ways. Also it is to be understood that the phraseology and terminology employed herein is for the purpose of description and not of limitation.

In accordance with the invention I provide an ornamental molding of a resilient but relatively rigid character and of a certain predetermined size for an automobile of a definite make and model. I impart to such molding the requisite rigidity and strength, ensuring sufficiently strong resilient grip of the molding by bending over the edges of the molding at the ends of the legs of its generally U-shape cross section. In applying the molding to the edge, I first provide on said edge a plurality of compensating sheet metal clips which may be distorted by finger pressure and slipped over the edge of the door at predetermined places. The resiliency of the compensating clips must be sufficient merely to retain them in place when applied to the edge. Thereupon, I slip the molding over such clips, causing gripping both of the clips and of the door edges by said molding. Thus, the edges of the molding actually do not touch the paint of the door edge but slide over the surfaces of the compensating clips collapsing the same still further and gripping the door edge through such compensating clips. The metal for making compensating clips is so selected that the clips can be easily pre-collapsed by finger pressure and applied to the door edge.

Figure 1:
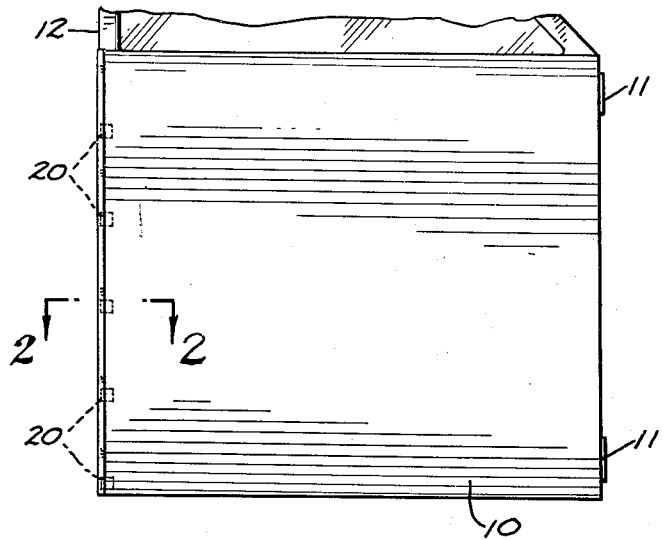
Fig. 1 is an elevational fragmentary view of an automobile body, particularly the door thereof, showing the ornamental molding applied to the trailing edge of the said door.
Figure 2:
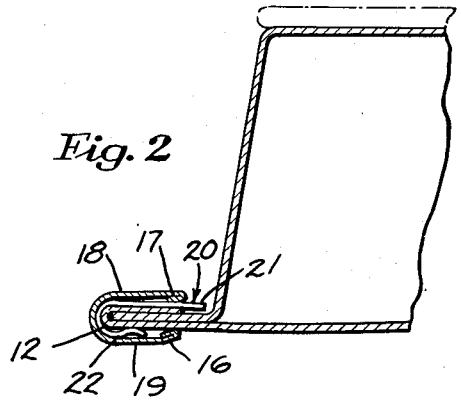
Fig. 2 is a sectional view taken in the direction of the arrows on a section plane passing through the line 2—2 of Fig. 1.
Figure 3:
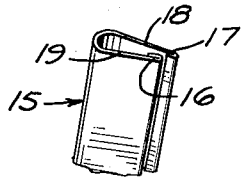
Fig. 3 is a perspective view of a portion of the molding shown separately.

Referring to the drawings and particularly to Figs. 1–3 thereof, the door, generally designated by the numeral 10, which may be of any suitable construction, is hinged on the body construction, as indicated at 11, in a manner well known in the art and has a vertically extending trailing edge 12. The trim molding adapted to be applied to the edge 12 is shown separately in Fig. 3 and is designated therein by the numeral 15.

Said molding 15 comprises a strip of suitable sheet metal, such as stainless steel, bent substantially to a U-shape, with the ends of the legs of its U cross section bent upon themselves inwardly of the U, as designated at 16 and 17. Such an expedient increases the general rigidity of the molding and rounds up the edges thereof, thus eliminating burrs and sharp edges that may otherwise be present on such edges, without requiring expensive polishing of such edges.

The inner leg 18 and the outer leg 19 of the molding are coming very close together at their ends to require their opening and tensioning when applied to the edge. Such a construction is apparent from examination of Figs. 2 and 3. Fig. 3 shows the ends of the legs coming close together, while in Fig. 2, wherein the molding is shown applied to the edge, they are spread apart for a considerable distance to cause resilient pressure of the legs on the compensating clips 20 and the edge 12.

Figure 4:
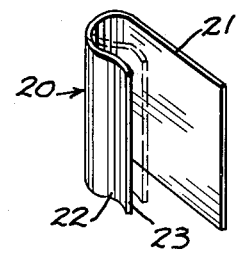
Fig. 4 is a perspective view showing separately and on an enlarged scale, one of the compensating clips used in the construction shown in Figs. 1 and 2.

Compensating clips, one of which is shown separately in Fig. 4, are made of relatively thin sheet metal material, preferably metal known in the trade as semi-hard, which metal possesses certain amount of resiliency but is sufficiently soft to be susceptible of bending, collapsing or distorting by finger pressure. The clips are bent to a generally U-shape, with their inner leg 21 being longer than the outer leg 22, and the edge of said leg 22 being turned outwardly as indicated at 23 to facilitate slipping of the clip over the door edge and to prevent damaging of the paint on the outside of the door in application of the clips. No such precaution is necessary on the inner side of the door edge, and therefore the edge of the leg 21 may be left straight.

The width of the leg 22 is substantially less than that of the outer leg 19 of the molding in order to ensure that the clip is fully covered on the outside of the door edge by the molding. Covering of the clips by the molding on the inside edge of the door is not necessary, and therefore the leg 21 of the clips may be made larger and broader and protrude from under the molding as shown in Fig. 2.

In application of the molding, a number of clips such as 20 is first applied to the door edge 12, said clips being arranged equidistantly over the edge intended to be covered by the molding. The clips are first tried on the edge and if they do not remain thereon, they are squeezed or gripped by fingers until they remain on the door as when slipped thereon.

With the clips 20 thus being in place, the molding 15 is then applied to the edge over said clips. Application of the molding 15 may require considerable pressure and a rubber hammer may be necessary to drive the molding over the edge.

It will now be seen in view of the foregoing, that the rounded edges of the molding slide over the clip rather than the paint at the door edge and, when fully applied, grip the clips and the door edge through the medium of the clips to provide a secure but resilient connection. Such a connection eliminates the possibility of rattling or working of the molding off the edge and yet it does not damage the edge or the finish thereof. It does not require drilling or cutting of the door edge, which being irreparable modifications, may not be desired. The molding 15 may be highly polished on the outside to match the other trim and hardware of the door. On the other hand, retaining clips 20 need not be finished in any particular manner.

It should be appreciated that while the molding 15 is preferably made of metal to have hard and shiny outside surface, the clips 20 may be made of a large number of materials. Sheet metal, plastic, fabrics and similar materials may be used with success.

Figure 5:
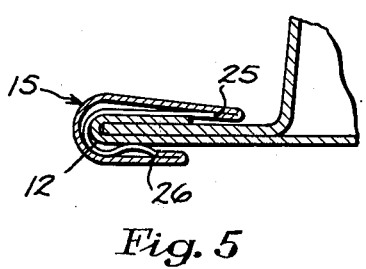
Fig. 5 is a view similar in part to Fig. 2 and showing a modified construction of the ornamental molding.

The edges of the retaining clips may engage the bent over edges of the molding such as indicated at 25 and 26 in Fig. 5. With such a construction, removal of the molding will cause removal of the clips.

With the construction such as shown in Fig. 2, the molding may be slipped off the clips without removal of the clips themselves or any appreciable relative movement between the clips and the door edge, whereby ensuring that no damage to the finish of the door edge is done.

It will be also seen that with the improved construction described above there is sufficient space between the molding and the edge of the door to ensure proper drainage and ventilation and thus prevent the moisture to collect within the molding and cause rusting of the interior of the construction.

By virtue of the construction described above, the objects of the present invention listed above and numerous additional advantages are attained.

I claim:

An ornamental and protective molding adapted to be connected to an automobile door along at least a portion of the trailing edge thereof, said molding comprising a strip of sheet metal having a U-shaped cross section, the edges of said strip at the ends of both legs of the U cross section of said strip being bent upon themselves inwardly of the U, and a plurality of compressible compensating clips adapted to be slipped over the door edge, said strip being adapted to be applied to said door edge over said clips and to grip said clips and said edge, said clips being made of sheet material and bent to a generally U-shape with the inner leg of the U being longer than the outer leg, said outer leg being shorter than the outer leg of the U of the molding strip.

References Cited in the file of this patent

UNITED STATES PATENTS

| Number | Name | Date |
|---|---|---|
| 1,800,060 | Farrington | Apr. 7, 1931 |
| 2,146,090 | O'Rourke | Feb. 7, 1939 |
| 2,216,219 | Wiley | Oct. 1, 1940 |